JOHN FREARSON.
Improvement in Water-Tuyeres for Furnaces, Forges, &c.
No. 127,042. Patented May 21, 1872.

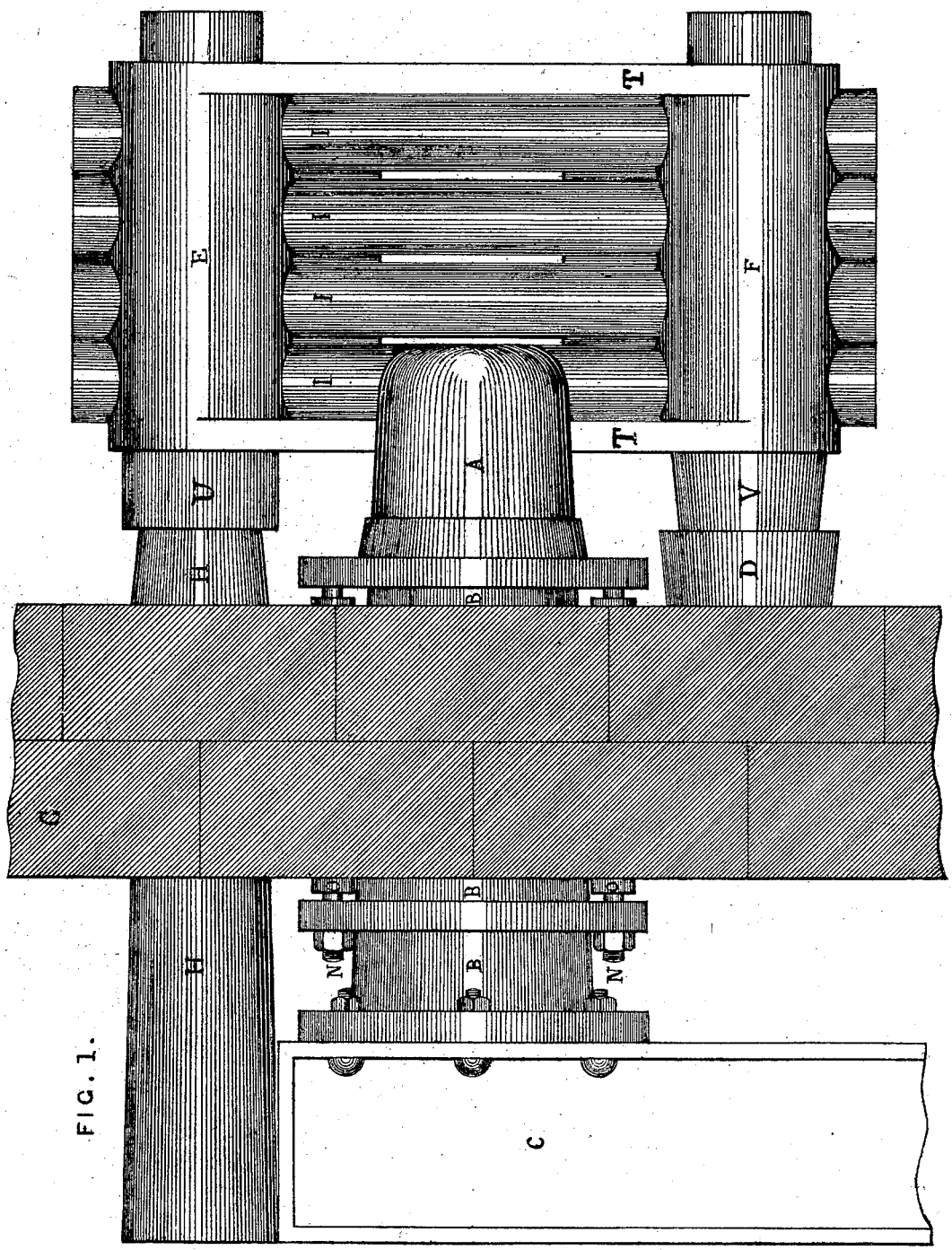

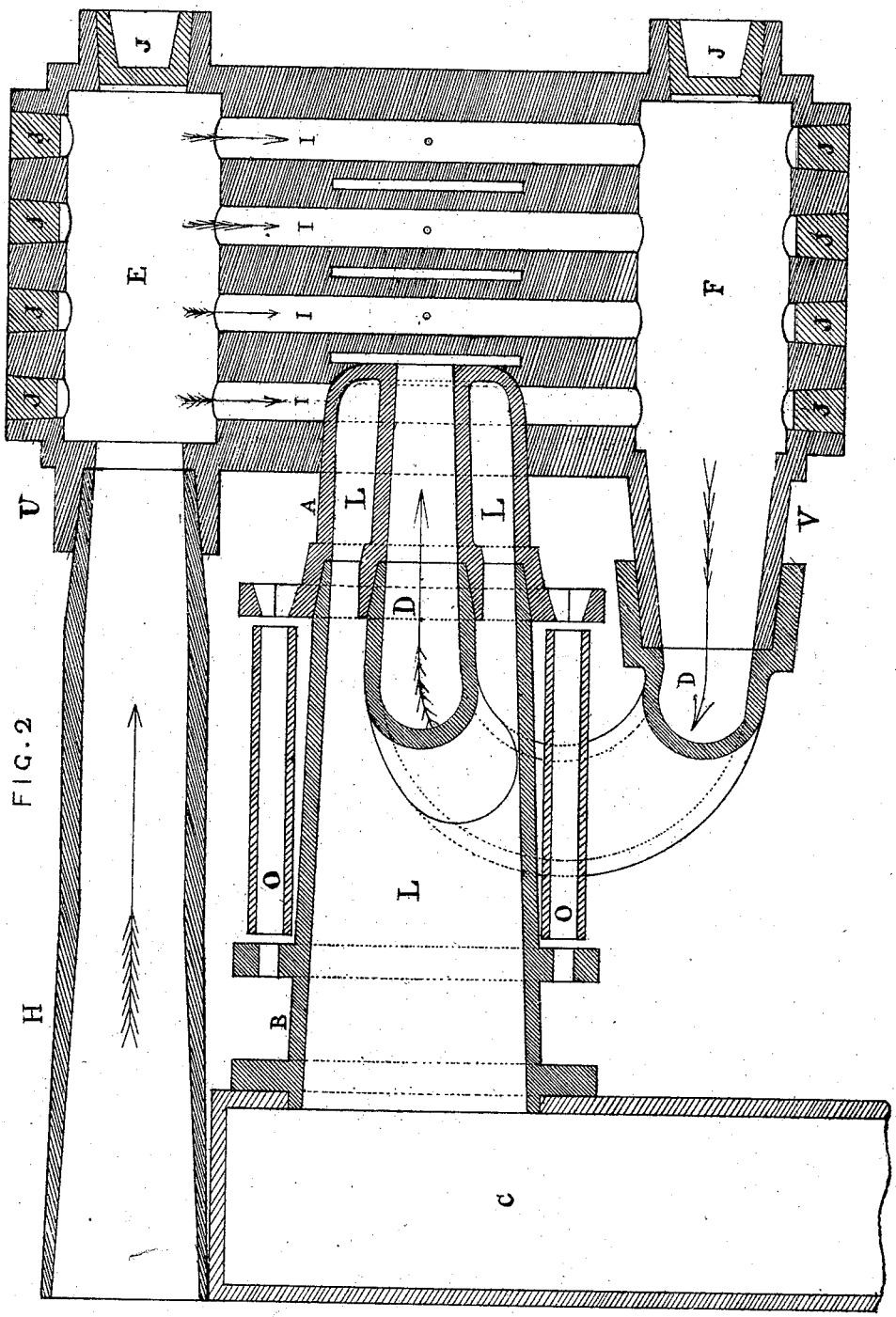

6 Sheets--Sheet 3.

Witnesses
John B. Gould
J. Mauer

John Frearson.

JOHN FREARSON.
Improvement in Water-Tuyeres for Furnaces, Forges, &c.
No. 127,042. FIG. 10. Patented May 21, 1872.
6 Sheets--Sheet 4.
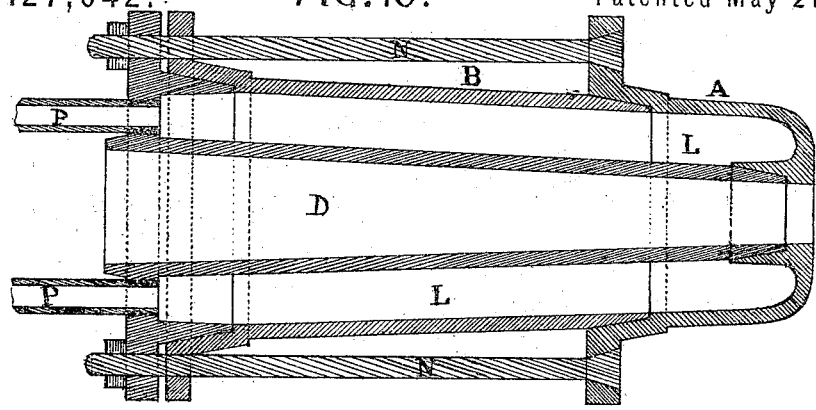
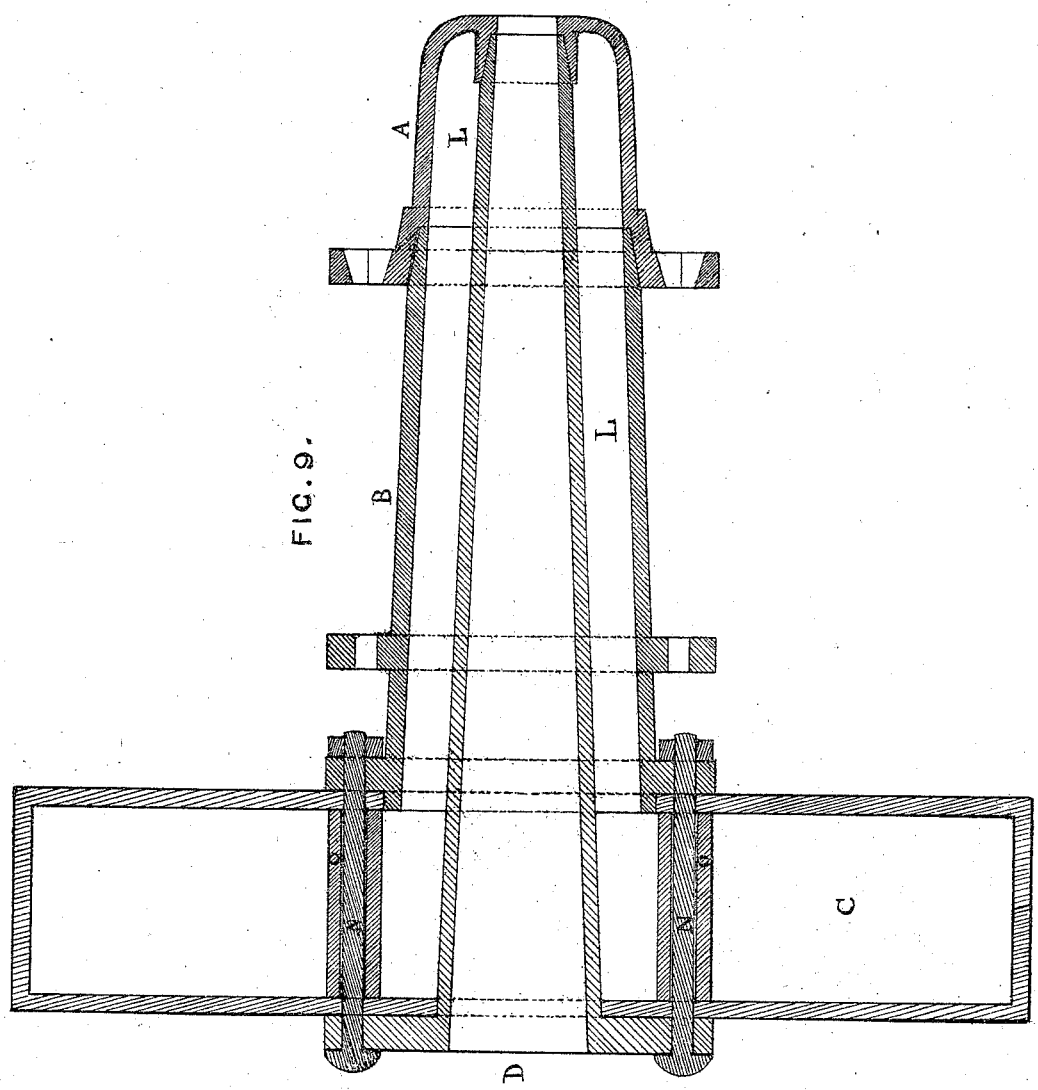

JOHN FREARSON.
Improvement in Water-Tuyeres for Furnaces, Forges, &c.
No. 127,042. Patented May 21, 1872.
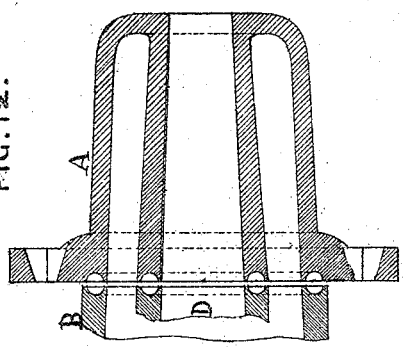
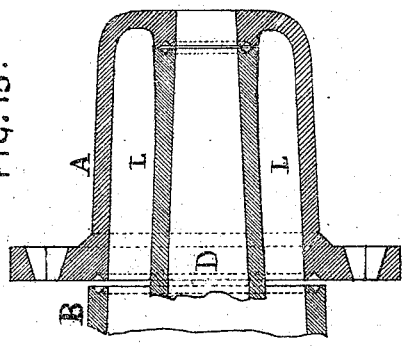
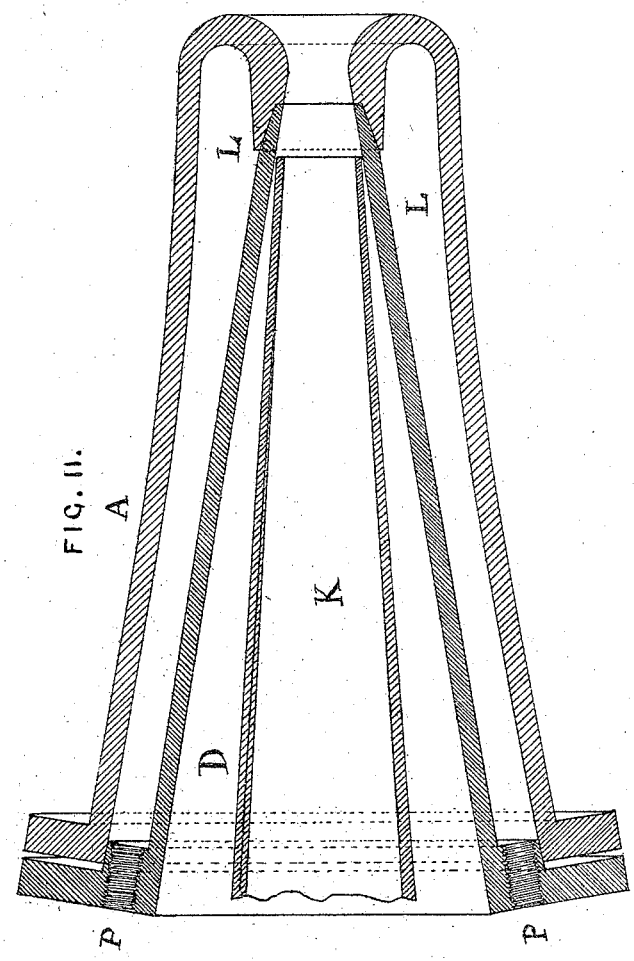

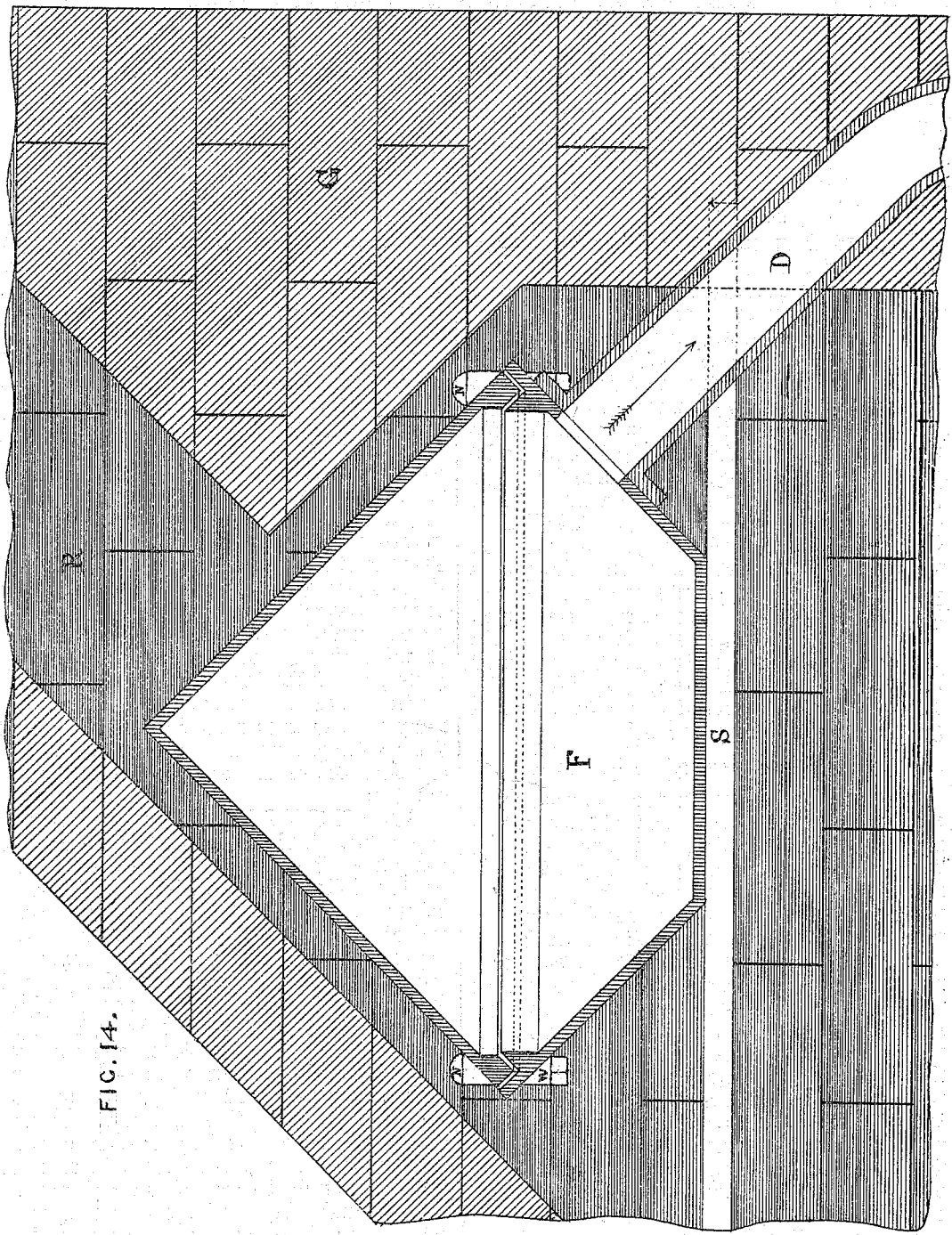

UNITED STATES PATENT OFFICE.

JOHN FREARSON, OF BIRMINGHAM, ENGLAND.

IMPROVEMENT IN WATER-TUYERES FOR FORGES, &c.

Specification forming part of Letters Patent No. 127,042, dated May 21, 1872.

SPECIFICATION.

I, JOHN FREARSON, of Waverley House, the Crescent, Birmingham, in the county of Warwick, England, mechanical engineer, have invented certain Improvements in Water-Tuyeres for Forges and Furnaces, and in apparatus connected with tuyeres.

Before describing my invention, I will remark that Frederick Worcester, of Stoke, in the county of Warwick, obtained an English patent in the year 1868, No. 1,949, for the invention of improvements in tuyeres for forges and furnaces, being a communication from John Bayliss, of New York, of the United States of America. Although this invention was an improvement for hot-blast, there were certain objections to its use, which objections I overcame, and for my "improvements in water-tuyeres for forges and furnaces and in apparatus connected therewith" I obtained an English patent in the year 1869, No. 2,929, and which patent essentially "covers the whole ground" of the present invention.

Nature and Objects of the Invention.

My invention relates to the combination of an air-heating apparatus, and in the arrangement of the air-heating and air-conducting passages placed under and over the forge or furnace fire with the tuyere for the purpose of producing hot-blast; the air-heating apparatus, which is placed under the fire, being so constructed as to relieve the fire of slag and produce an intense heat; the construction of water-tuyeres in separate parts, so that they may be cast or forged and easily combined; to the combination of the water-tuyere with the water-cistern without the intervention of water-pipes for hot-blast; and to the combination of the body part of water-tuyeres with a movable nose part for hot and cold blast, so that when the nose part is worn out it may easily be removed from the body part of the tuyere and another one attached at a small cost without disturbing the wall, or the body part of the tuyere, or the water-pipes, or the water-cistern.

General Description of the Accompanying Drawings.

Figure 5:
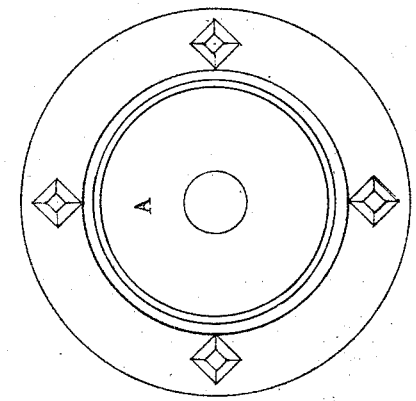
Figure 4:
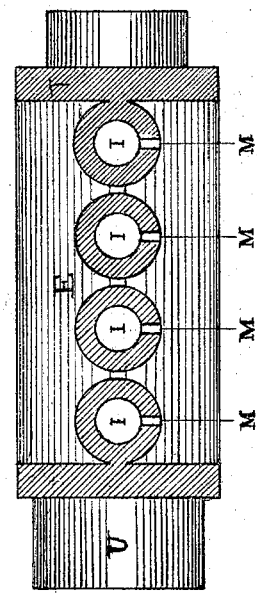
Figure 6:
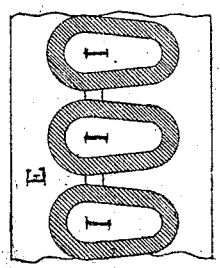
Figures 3, 7:
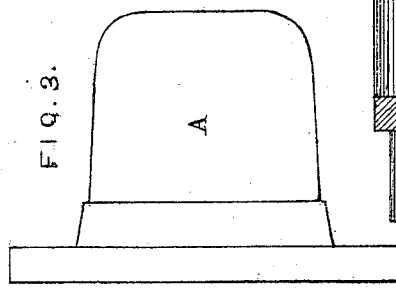

Figure 1 is a plan of the water-cistern and of the air-heating apparatus with the air-conducting pipes, and of the water-tuyere; also a horizontal section of the forge-wall. Fig. 2 is a horizontal section of Fig. 1 through the center of the tuyere and through the center of the air-conducting pipes, and air-heating apparatus, which are on a plane lower than that of the tuyere. Fig. 3 is an outline elevation of the nose part of the tuyere; and Fig. 4 is a vertical section through the center of the air-heating apparatus, showing that side of it marked E in Figs. 1 and 2. Figs. 3 and 4 represent the relative positions vertically of the tuyere and of the air-heating apparatus. Fig. 5 is an elevation of the body part of the tuyere viewed from the back, showing the position of the air-conducting curved pipe; and Fig. 6 is an elevation of the nose part of the tuyere viewed from the front, showing the countersunk holes in the flange for the heads of the bolts for securing the nose part to the body part of the tuyere.

The letters of reference in all the drawings are placed so as to show the position at which the drawings are to be viewed, and the letters of reference are the same for similarly-named articles.

E F T T U V I I I I show the air-heating apparatus. T T E F form the framing of the fire-grate. E is the cold-air receiver. I I I I are the hollow fire-bars. F is the hot-air receiver. H is the cold-air conducting pipe, one end of which receives the pipe of the blowing apparatus, and the other end is coned to fit the coned socket U. V is a coned pipe, which fits the coned socket of the curved pipe D. Under the fire-bars is the ash-pit, having an air-tight door, which is closed when at work. There is a small hole or a number of them on the under side of the air-heating apparatus, within the ash-pit, to admit sufficient air to the lower part of the forge-fire, as shown by M. By this arrangement the cold air is conducted through the pipe H to the chamber E; then through the hot hollow bars I into the ash-pit, and into the hot-air receiver F, and makes its exit through the curved pipe D of the tuyere into the forge or furnace fire. By the hot air passing between the fire-bars from the ash-pit, the bottom of the fire may be kept sufficiently hot to heat the fire-bars, and a great body of heat may be produced under the article to be heated.

Figure 8:
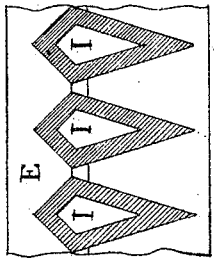

Figs. 7 and 8 represent other forms of hollow fire-bars, which may be perforated on their under sides. The joints H U and D V may be made air-tight by the use of pulverized fire-clay, and also by the plugs J. The spaces occupied by the plugs J are required to form air-openings during the process of casting the air-heating apparatus. In making the core for this apparatus it is advisable to pass large perforated tubes through E and F and the large plugs J, and small perforated tubes through them opposite to the centers of I and J. By this means a sound casting may be produced.

The body part of the tuyere B, Figs. 1 and 2, has on it two annular flanges at the back of the forge wall, one for securing to it the water-cistern C, and the other for securing the nose part A to the body part. The nose part A has also a flange to correspond with that of the body part of the tuyere. The coned and flat-end junctions of B, D, and A, are made air and water-tight by means of red or white lead of the consistency of putty, or other suitable material; and screw-bolts N are passed through holes in the flanges of the movable nose part A, and through the bushes O, and through the flange on the body part of the tuyere B, at the back of the forge-wall G, and the nuts on the bolts N are screwed up until the joints are made air and water tight. By this arrangement the bushes O in the wall G form free passages for the bolts, which may readily be withdrawn and reinserted when a new nose part is required to be fitted to the body part of the tuyere; or the movable nose part may be taken off and the scale formed inside removed and put on again, as before, or turned upside down, without disturbing the wall or the connection between the tuyere and the cistern. By this arrangement much labor, time, and expense are saved.

Fig. 14 represents in vertical section a portion of the forge-chimney and wall G, and an air-heating chamber, F, situated above the forge-fire, resting upon two iron bars, S; or it may be supported by the two pipes on the right-hand side and on the left by an arm passing from the boss W through the brick-work.

The tuyere most suited for this air-heating apparatus is that represented in Figs. 1 and 2, with its curved pipe-socket D turned in the position to receive the lower end of the pipe which is connected to the chamber F. The chamber F is provided with a V-shaped groove all round its upper side, and its lid has a V-shaped projection, which fits the V-shaped groove in the air-chamber F, and this joint is made air-tight by pulverized fire-clay or other suitable cement, and both parts of the chamber F are secured by the bolts N. The feed-air pipe (not shown) may be fixed in any convenient position. By this arrangement, the heat from the forge fire, ascending into the chimney, passes under, around, and above the air-chamber F, and the heated air passes from the air-chamber F and through the hot-air pipe D, and through the tuyere into the forge-fire. The shape of the back and front of the mouth of the forge-chimney will give the shape of those sides of the lid of the chamber F. Fig. 9 is a horizontal section through the center of a tuyere for hot or cold blast. The body part B has upon it two flanges, the same as those shown in Figs. 1 and 2, and for the same purpose; but instead of the curved pipe this tuyere has a straight central one, D, which passes through the cistern and through the body part of the tuyere. The thin end of the taper pipe D is coned to fit the socket in the nose part A, and the large end has upon it an annular flange to correspond with those on the body part of the tuyere. The bolts N are passed through the flange on D, through the sides of the cistern C and the bushes O, and through the flange of the body part B, and the nuts on the bolts N are screwed up until the central air-passage pipe and the body part of the tuyere are firmly secured to the cistern. Instead of the flange on D, Fig. 9, being placed outside the cistern it may be made smaller so as to pass through the large opening in the cistern, and secured to the cistern inside by separate bolts. The joints of the tuyere, Fig. 9, are made air and water tight, and the nose part and the body part of the tuyere are secured in their positions, as before described and represented in Fig. 1. Figs. 9 and 10 are so constructed as to connect them to the water-cisterns in the usual manner, by means of the pipes P. Fig. 11 has a long nose part, A, and the back part of A and that of D are made wide so as to keep the cooling surface of D from the hot-blast pipe K, except at its narrow end. The cone upon the large end of D is made to fit the inside of A, and the small end of D is made to fit the coned socket of the nose A, and the two flanges are bolted together in the usual manner. Fig. 10 is a tuyere composed of three parts, A, B, and D. The back part of D has a conical projection which fits the back part of B. The flange on D and that on B are secured together by short bolts and nuts, and the bolts N are passed through the flanges A, B, and D, and the nuts are screwed up until the nose part is made secure to the body part. Fig. 12 represents another mode of making the joints of the parts A, B, and D. There is a large and a small annular semicircular groove in cross-section in the nose part A, and there is a groove in the body part B to correspond with the large one in A, and a groove in the D part to correspond with the small one in A. In these grooves I insert round wire rings of soft copper or lead, coated with red or white lead to make them adhere to the grooves before attaching the nose part to the body part of the tuyere. I then attach the nose part to the body part, and screw up the parts by means of bolts and nuts, as before described. Fig. 13 represents grooves in the parts A, B, and D, of a square shape in cross-section, which grooves require rings of the same shape. But I do not confine myself to the forms of rings for making the joints, nor to the shapes of the grooves or spaces in which they are placed, nor to the shapes of the joints, as other forms and materials than those represented and described may be found to answer the purpose. L represents the water-space in the various tuyeres. I also use an air heating and conducting pipe or passage having a zigzag or other form beneath or above the forge-fire without the air heating-chambers shown in Figs. 1 and 6.

Having described the nature of my invention, and in what manner the same is to be performed, I wish it to be understood that I do not confine or limit myself to the precise details herein described and illustrated, as the same may be varied without departing from the nature of my invention; but I claim, as my invention of improvements in water tuyeres for forges and furnaces, and in apparatus connected with tuyeres—

1. The combination of the water-tuyere with the water-cistern without the intervention of separate water-pipes for hot-blast, substantially as and for the purpose hereinbefore described, and illustrated in the accompanying drawings.

2. The combination of the water-tuyere with the air-receivers or hollow fire-bars or air-pipes situated under the forge or furnace fire for hot-blast, substantially as and for the purpose hereinbefore described and represented or illustrated in the accompanying drawings.

3. The combination of the water-tuyere with the air-chamber or air-pipes situated over the forge or furnace fire for hot-blast, substantially as and for the purpose hereinbefore described, and represented in the accompanying drawings.

4. The combination of the body part of water-tuyeres with a movable nose part for hot and cold blast, substantially as and for the purposes hereinfore described, and represented in the accompanying drawings; and 5. The methods described and illustrated of attaching the said movable nose part to the body part of the tuyere.

JOHN FREARSON.

Witnesses:
JOHN B. GOULD.
J. BRAUER.